US012645236B2

(12) United States Patent
Dubey et al.

(10) Patent No.: US 12,645,236 B2
(45) Date of Patent: Jun. 2, 2026

(54) PROCESS AND TEMPERATURE TRACKING ON-CHIP SUPPLY REGULATION FOR LOW JITTER APPLICATIONS

(71) Applicant: XILINX, INC., San Jose, CA (US)

(72) Inventors: Hari Bilash Dubey, Hyderabad (IN); Siva Charan Nimmagadda, Nellore (IN)

(73) Assignee: XILINX, INC., San Jose, CA (US)

( * ) Notice: Subject to any disclaimer, the term of this patent is extended or adjusted under 35 U.S.C. 154(b) by 321 days.

(21) Appl. No.: 18/207,497

(22) Filed: Jun. 8, 2023

(65) Prior Publication Data

US 2024/0411331 A1 Dec. 12, 2024

(51) Int. Cl.
*G05F 1/56* (2006.01)
*G05F 1/567* (2006.01)
*G05F 1/575* (2006.01)

(52) U.S. Cl.
CPC ................ *G05F 1/56* (2013.01); *G05F 1/567* (2013.01); *G05F 1/575* (2013.01)

(58) Field of Classification Search
CPC ............. G05F 1/56; G05F 1/575; G05F 1/567
See application file for complete search history.

(56) References Cited

U.S. PATENT DOCUMENTS 6,522,114 B1 * 2/2003 Bakker ................... G05F 1/467 323/282
7,397,226 B1 * 7/2008 Mannama ............... G05F 1/575 327/558
9,983,604 B2 * 5/2018 Lee ......................... G05F 1/575
10,866,607 B1 * 12/2020 Avci ........................ G01S 7/484
11,256,281 B2 * 2/2022 Liang ...................... G05F 1/595
11,829,175 B2 * 11/2023 Agarwal ................. G05F 1/575
2008/0054873 A1 * 3/2008 Inoue ...................... G05F 1/575 323/351
2015/0220096 A1 * 8/2015 Luff ...................... G02F 1/1368 323/273
2019/0294189 A1 * 9/2019 Sakaguchi .............. G05F 1/565
2023/0113887 A1 * 4/2023 Liu ........................... G05F 1/10 327/540
2023/0221743 A1 * 7/2023 Lin ......................... G05F 1/575 323/273

* cited by examiner

*Primary Examiner* — Sisay G Tiku
(74) *Attorney, Agent, or Firm* — Patterson + Sheridan, LLP

(57) ABSTRACT

On chip integrated circuit supply voltage regulator has a reference voltage that varies, based on process and temperature conditions of the integrated circuit. Supply voltage is boosted up if the active transistor load devices operate in a Slow-Slow process condition and/or temperature rises. Higher supply voltage improves the system performance (jitter/delay) if the load network includes switching components. If the active transistor load devices operate in a Fast-Fast process condition then the supply voltage is reduced without loss of performance and a savings in power. The variable reference voltage is generated based on process and temperature conditions of the semiconductor integrated circuit devices (transistors). The voltage regulator will automatically have its variable reference voltage adjusted based upon the process condition fabrication and temperature of the areas of the integrated circuit where the active transistor load devices are located.

19 Claims, 5 Drawing Sheets

PROCESS AND TEMPERATURE TRACKING ON-CHIP SUPPLY REGULATION FOR LOW JITTER APPLICATIONS

TECHNICAL FIELD

Embodiments of the present disclosure generally relate to integrated circuit (IC) System-On-Chip (SoC) architectures, and in particular, to enhanced SoC voltage supply regulation to critical clock and data circuits of the IC.

BACKGROUND

In semiconductor manufacturing, a process corner is an example of a design technique that refers to variations of fabrication parameters when designing integrated circuits on a semiconductor wafer. Process corners represent the extremes of these parameter variations of the circuit fabricated on the semiconductor wafer that must function correctly. A circuit running on devices fabricated at these process corners may run slower or faster than specified and at lower or higher operating temperatures and/or voltages. A process corner represents a significant variation from nominal doping concentrations in transistors on the semiconductor wafer.

Front end of line (FEOL) process corners affect the performance of the semiconductor device. One naming convention for process corners uses two-letter designators, where the first letter refers to the N-channel metal oxide semiconductor field effect transistor (MOSFET) or NMOS corner, and the second letter refers to the P-channel (PMOS) corner. In this naming convention, three process corners exist: "typical," "fast" and "slow." Fast and slow corners exhibit a carrier mobility that is higher and lower, respectively, than a normal (typical). There are five possible corners: typical-typical (TT), fast-fast (FF), slow-slow (SS), fast-slow (FS), and slow-fast (SF). The first three corners (TT, FF, SS) are called even corners, because both types of devices are affected evenly, and generally do not adversely affect the logical operation of the circuit. The resulting devices can correctly operate at slower or faster clock frequencies, depending upon the supply voltage thereto.

SUMMARY

In one example of the disclosure, an apparatus for on-chip integrated circuit voltage regulation includes a first voltage regulator having an input coupled to a reference voltage and an output providing a first regulated voltage. A bias voltage generator having an input coupled to the first regulated voltage and an output providing a bias voltage based upon process conditions of semiconductor devices of the integrated circuit. And a second voltage regulator having an input coupled to the bias voltage from the bias voltage generator and an output providing a second regulated voltage based upon the process conditions of the semiconductor devices of the integrated circuit.

In one example of the disclosure, an integrated circuit (IC) System-On-Chip (SoC) includes a plurality of on-chip integrated circuit voltage regulators adapted for providing optimal operating voltages to a plurality of digital logic circuits associated with the plurality of on-chip integrated circuit voltage regulators, wherein each of the plurality of on-chip integrated circuit voltage regulators comprises. A first voltage regulator having an input coupled to a reference voltage and an output providing a first regulated voltage. A bias voltage generator having an input coupled to the first regulated voltage and an output providing a bias voltage based upon process conditions of semiconductor devices of the integrated circuit. And a second voltage regulator having an input coupled to the bias voltage from the bias voltage generator and an output providing a second regulated voltage based upon the process conditions of the semiconductor devices comprising the digital circuits of the integrated circuit, wherein each pair of on-chip integrated circuit voltage regulators and digital logic circuits are located in different portions of the integrated circuit.

In one example of the disclosure, a method for adjusting an output voltage of an on-chip integrated circuit voltage regulator includes adjusting an output voltage of an on-chip integrated circuit voltage regulator based upon process conditions of the semiconductor devices of the integrated circuit, the output voltage is adapted for coupling to and powering the semiconductor devices of the integrated circuit. Raising the output voltage when the integrated circuit semiconductor devices are operating at a slow-slow (SS) process condition. And lowering the output voltage when the integrated circuit semiconductor devices are operating at a fast-fast (FF) process condition.

BRIEF DESCRIPTION OF THE DRAWINGS

So that the manner in which the above recited features of the present invention can be understood in detail, a more particular description of the invention, briefly summarized above, may be had by reference to examples, some of which are illustrated in the appended drawings. It is to be noted, however, that the appended drawings illustrate only typical examples of this invention and are therefore not to be considered limiting of its scope, for the invention may admit to other equally effective examples.

Figure 1:
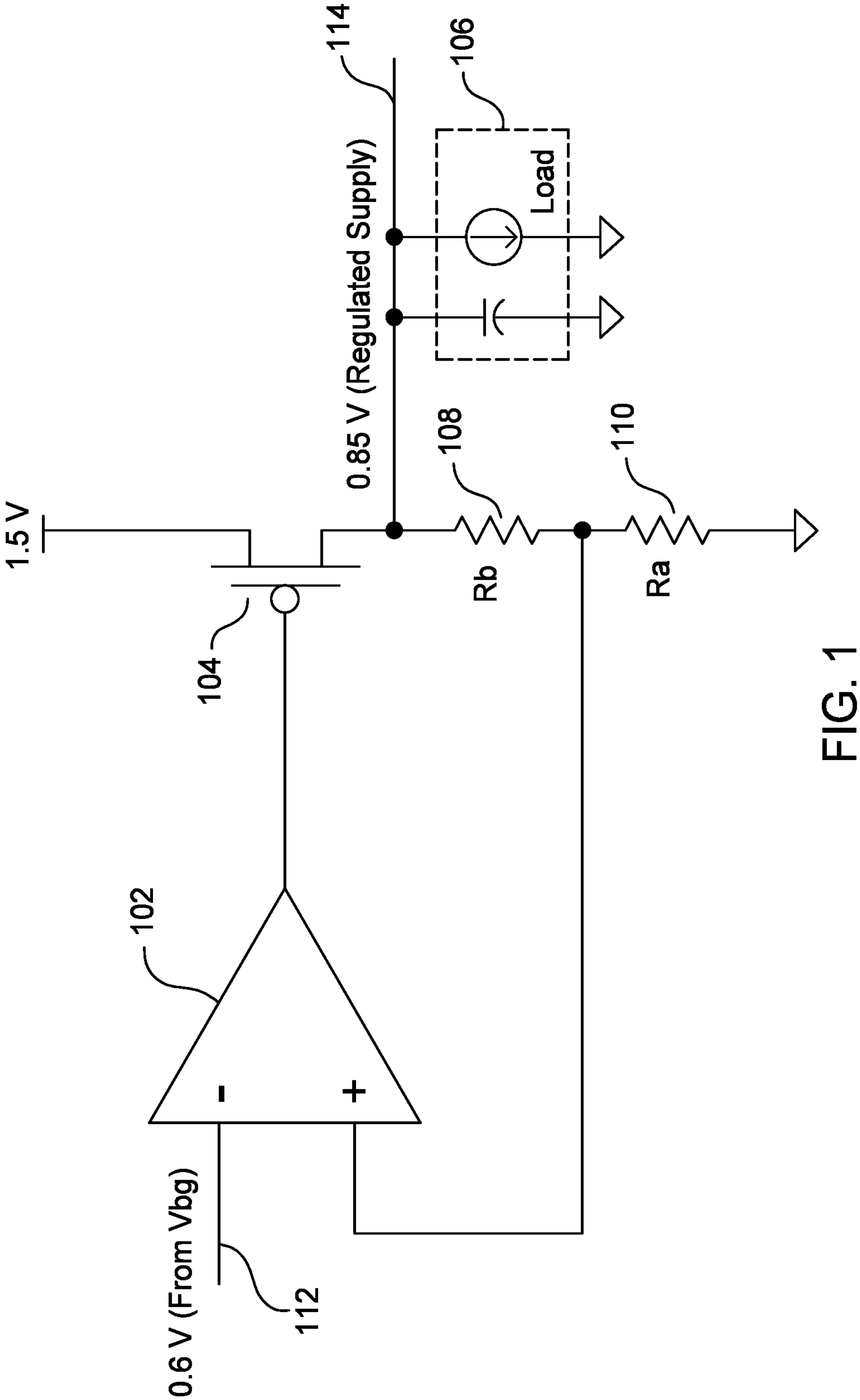
FIG. 1 ( Prior Art )
FIG. 1 illustrates a schematic diagram of a prior art low drop out (LDO) voltage regulator.

To facilitate understanding, identical reference numerals have been used, where possible, to designate identical elements that are common to the figures, and a lower-case letter added where the elements are substantially the same. It is contemplated that elements of one embodiment may be beneficially incorporated in other embodiments.

DETAILED DESCRIPTION

With increased integration of System-On-Chip (SoC) architectures, the switching noise on the digital logic power supply poses detrimental effects on clock/data jitter performance thereof. Dealing with the clock/data jitter performance becomes more challenging as the data rates increase to higher levels. Besides higher data rates, the process variations also restrict system performance. Over the years, there have been myriad applications of local voltage supply regulation techniques implemented to improve the SoC system performance. Regulated supply voltages may be used in many locations in a semiconductor integrated circuit device. A clock tree is one such critical design where a dedicated voltage regulator supply is recommended.

Examples herein provide for use of a variable reference voltage to generate a regulated voltage supply for critical timing logic circuits of a SoC. The variable reference voltage is generated based on process and temperature conditions of the semiconductor integrated circuit devices (transistors) of the SoC. If the process condition is Slow N-Slow P (SS) and/or device temperatures are elevated, the reference voltage is set high and the voltage regulated supply is also set to a higher voltage. With the higher supply voltage, the semiconductor device performance (jitter/delay) is improved. If the semiconductor device is fabricated in Fast N-Fast P process conditions, a lower regulated voltage supply is good enough for the same performance as in typical-typical (TT) and slow-slow (SS) process conditions, and with the benefit of a reduced total power consumption budget.

Various features are described hereinafter with reference to the drawing figures. It should be noted that the drawing figures may or may not be drawn to scale and that the elements of similar structures or functions are represented by like reference numerals throughout the drawing figures. It should be noted that the drawing figures are only intended to facilitate the description of the features of the examples. They are not intended as an exhaustive description of the examples below or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described. Referring now to the drawing figures, the details of examples are schematically illustrated. Like elements in the drawing figures will be represented by like numbers, and similar elements will be represented by like numbers with a different lower-case letter suffix.

Referring to FIG. 1, depicted is a schematic diagram of a prior art low drop out (LDO) voltage regulator. The LDO voltage regulator comprises an operational amplifier 102, a PMOS transistor 104, and voltage setting resistors 108 and 110. A reference voltage (0.6V) 112 is generated from a band gap reference voltage circuit (not shown) and is coupled to a negative input of the operational amplifier 102. An output voltage 114 (0.85V) will be constant if the band gap reference voltage circuit 112 remains constant to the operational amplifier 102. Voltage setting resistors 108 and 110 may be chosen based on the equation: 0.85 V=0.6 (1+Rb/Ra).

If the load devices 106 are operating in a Slow N-Slow P (SS) condition, there is high probability for inferior performance (delay and jitter) due to the higher MOSFET Vt of the load devices 106 in slow-slow operating conditions. In contrast, if the MOSFET devices are operating in a Fast N-Fast P condition, then performance metrics improve compared to Typical-Typical (TT) process conditions. The penalty paid is higher-power consumption due to lower Vt in Fast-Fast (FF) conditions. Providing the same performance as in the Typical-Typical (TT) process conditions, having a reduced total power consumption budget.

However, a problem exists when using a fixed voltage LDO voltage regulator, as shown in FIG. 1, if the semiconductor devices of a load network operate in Slow-Slow or in Fast-Fast process conditions. This becomes more critical if the load network is a clock or a data path, e.g., high speed clocks, phase-locked-loops (PLL), data registers and memory. As the data rates hit 10's of gigabits per second (Gbps), signal jitter, propagation delay and power consumption hamper performance. This problem may be resolved if the regulated voltage to the load network can be varied as necessary to accommodate operation of both Slow-Slow and Fast-Fast operating conditions of semiconductor devices of the load network.

Figure 2:
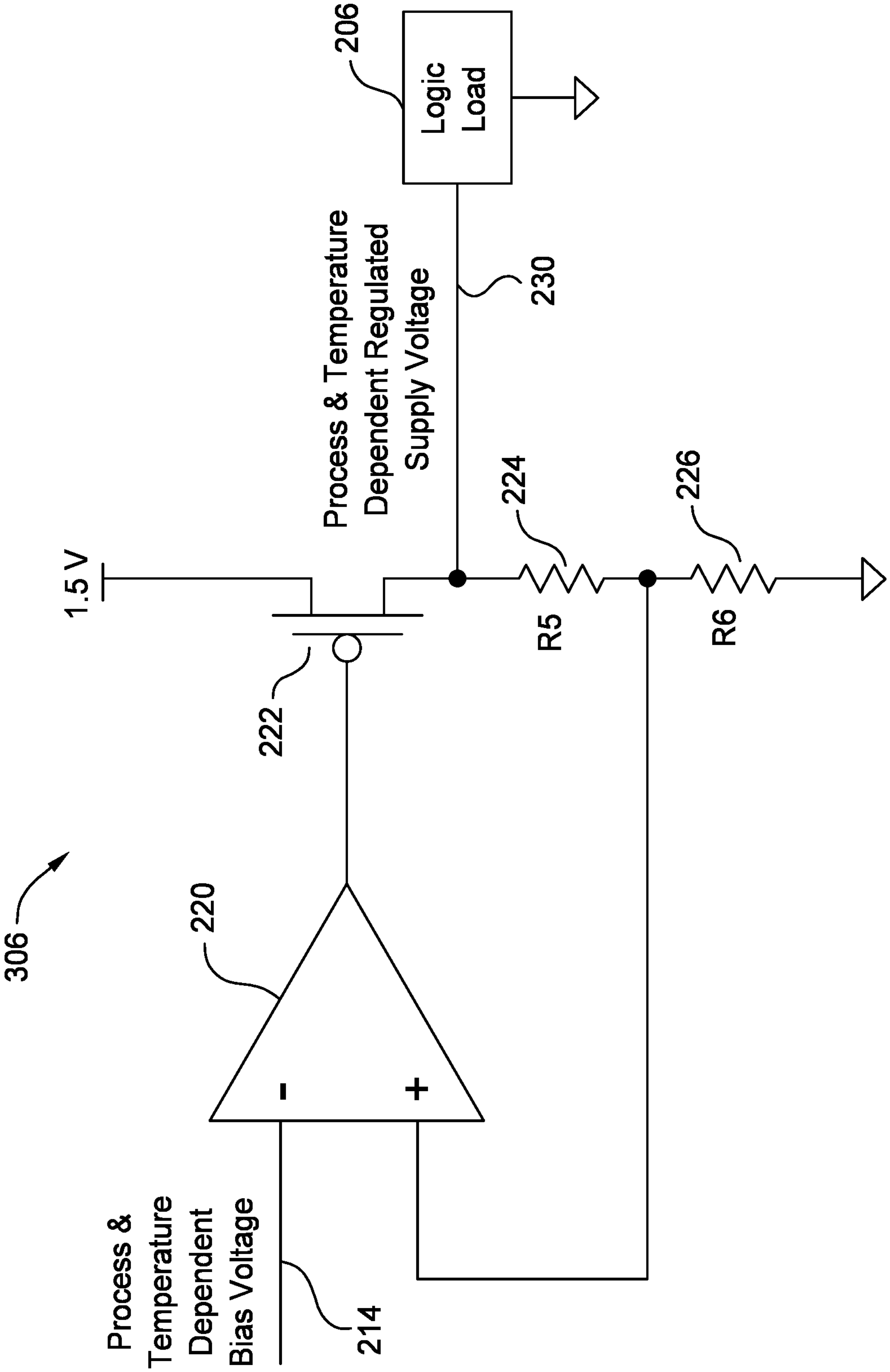
FIG. 2 illustrates a schematic diagram of a variable voltage regulator, according to an example.

Referring to FIG. 2, depicted is a schematic diagram of a variable voltage regulator, according to an example. The variable voltage regulator, generally represented by the numeral 306, is similar in operation to the LDO voltage regulator of FIG. 1. However, a process and temperature dependent bias voltage 214, instead of the fixed voltage reference 112 (FIG. 1), is coupled to a negative input of an operational amplifier 220. The process and temperature dependent bias voltage 214 is generated by a circuit 304 (FIG. 3) that monitors the process conditions and temperature of a local area of a semiconductor wafer 450 (FIG. 4) comprising the associated load network, e.g., logic load 206. Using the process and temperature dependent bias voltage 214, the variable voltage regulator 306 adjusts its voltage output to provide an appropriate process and temperature dependent regulated supply voltage 230 to the associated logic load 206, whether operating under Slow-Slow or Fast-Fast conditions.

For example, the process and temperature dependent regulated supply voltage 230 may be boosted by, for example but is not limited to, 50 to 100 millivolts compared to a nominal supply voltage when the transistor devices of the logic load 206 operate in Slow-Slow conditions. By applying a higher supply voltage to Slow-Slow condition devices, and/or devices operating at a higher temperature, of a clock/data path will result in an improvement to the overall system performance, (e.g., delay and jitter). However, the maximum voltage value of the regulated supply voltage 230 should not exceed the voltage reliability limit of the devices of the associated logic load 206.

When the transistor devices of the logic load 206 operate in Fast-Fast conditions, the process and temperature dependent regulated supply voltage 230 may be lowered by, for example but is not limited to, 50 to 100 millivolts less than the nominal supply voltage. Lowering the supply voltage 230 also reduces power consumption of the logic load 206 when operating in Fast-Fast conditions while still maintaining overall system performance of the (FF) devices.

Figure 3:
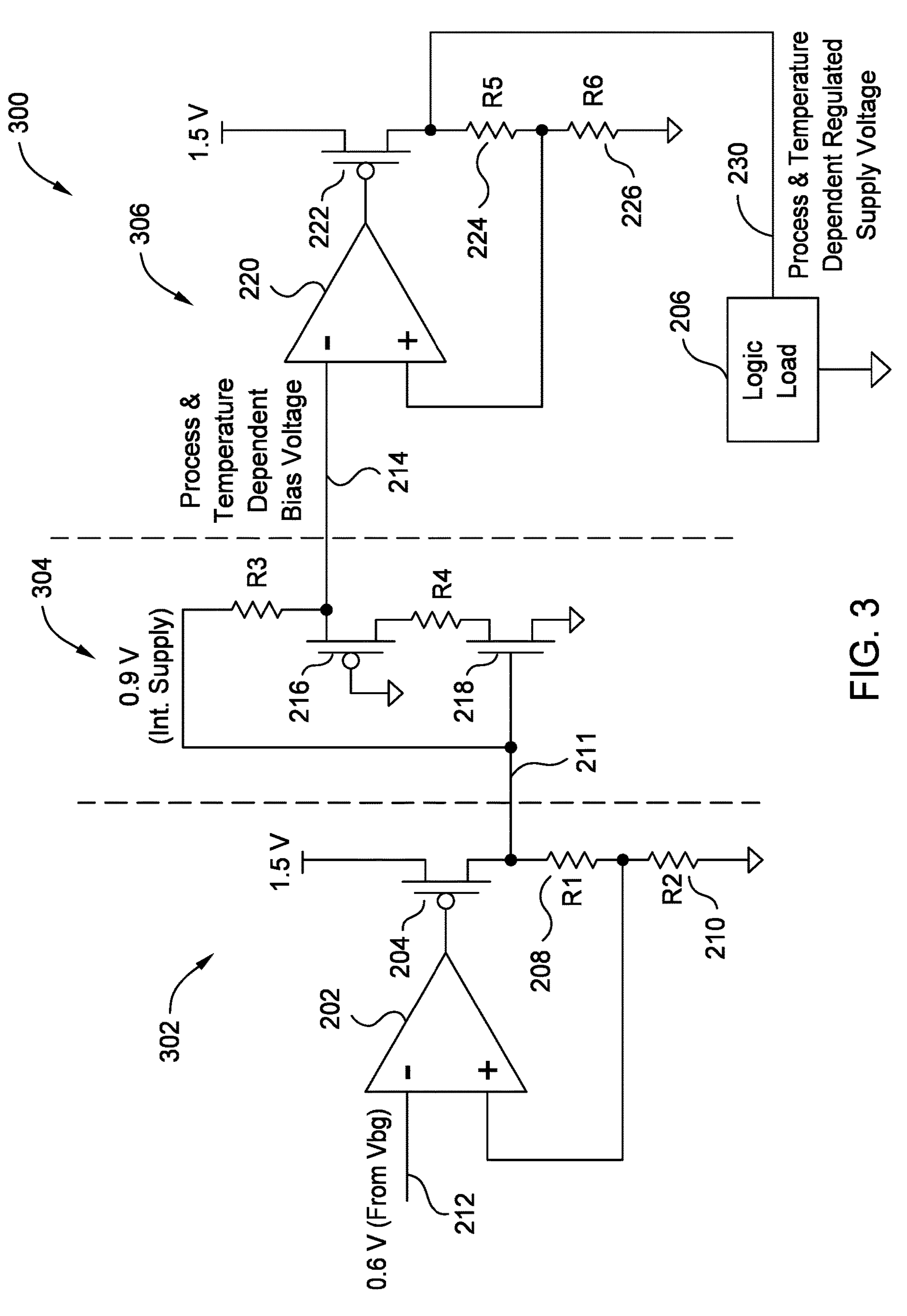
FIG. 3 illustrates a schematic diagram of a process and temperature dependent reference voltage generator and regulator, according to an example.

Referring to FIG. 3, depicted is a schematic diagram of a process and temperature dependent reference voltage generator and regulator, according to an example. The process and temperature dependent reference voltage generator and regulator, generally represented by the numeral 300, comprises a LDO voltage regulator 302, operationally similar to the LDO voltage regulator circuit shown in FIG. 1; a process and temperature dependent bias voltage generator 304, and a voltage regulator 306 having a voltage output 230 dependent upon a voltage 214 from the bias voltage generator 304.

A reference voltage (0.6V) 212 may be generated from a band gap reference voltage circuit (not shown) and is coupled to a negative input of the operational amplifier 202 of the LDO voltage regulator 302. An internal supply voltage 211, for example but not limited to 0.9V, will be constant if the band gap reference voltage 212 remains constant to the negative input of the operational amplifier 202. Voltage setting resistors 208 and 210 may be chosen based on the equation: 0.9 V=0.6 (1+R1/R2). The internal supply voltage 211 is coupled to the gate of the NMOS transistor 218 and to the source, through resistor R3, of the PMOS transistor 216.

In the process and temperature dependent bias voltage generator 302, the PMOS transistor 216 and NMOS transistor 218 are configured to adjust a process and temperature dependent bias voltage 214 based upon the process conditions of Fast-Fast, Typical-Typical or Slow-Slow of the semiconductor substrate in which the PMOS transistor 216 and NMOS transistor 218 are deposed. When the PMOS transistor 216 and NMOS transistor 218 are fabricated in a semiconductor die area resulting from a Slow-Slow process condition then the process and temperature dependent bias voltage 214 will be higher than when the semiconductor die area results from a Fast-Fast process condition. The PMOS transistor 216 and NMOS transistor 218 operate in their linear ranges.

The voltage regulator 306 uses the process and temperature dependent bias voltage 214 to adjust the voltage 230 supplied from the voltage regulator 306 to the logic load 206. The voltage regulator 306 may be configured as a LDO voltage regulator circuit, similar to the LDO voltage regulator 302, but with the feature of automatically adjusting the voltage 230 to optimize performance and power consumption of the logic load 206. When the process and temperature dependent bias voltage 214 goes up in value so will the voltage 230 from the voltage regulator 306, thus optimizing performance of semiconductor devices located in the same semiconductor die area at which PMOS transistor 216 and the NMOS transistor 218 of the process and temperature dependent bias voltage generator 304 are located.

It is contemplated and within the scope of this disclosure that any linear voltage regulator circuit could be used to function in the same fashion as the voltage regulator circuits 302 and 306 shown in FIG. 3. For the process and temperature dependent bias voltage generator 304, other NMOS and PMOS transistor device configurations can be used so long as an output voltage therefrom raises when the other NMOS and PMOS transistor configures are operating in the Slow-Slow process condition and lowered when operating in the Fast-Fast process condition.

Figure 4:
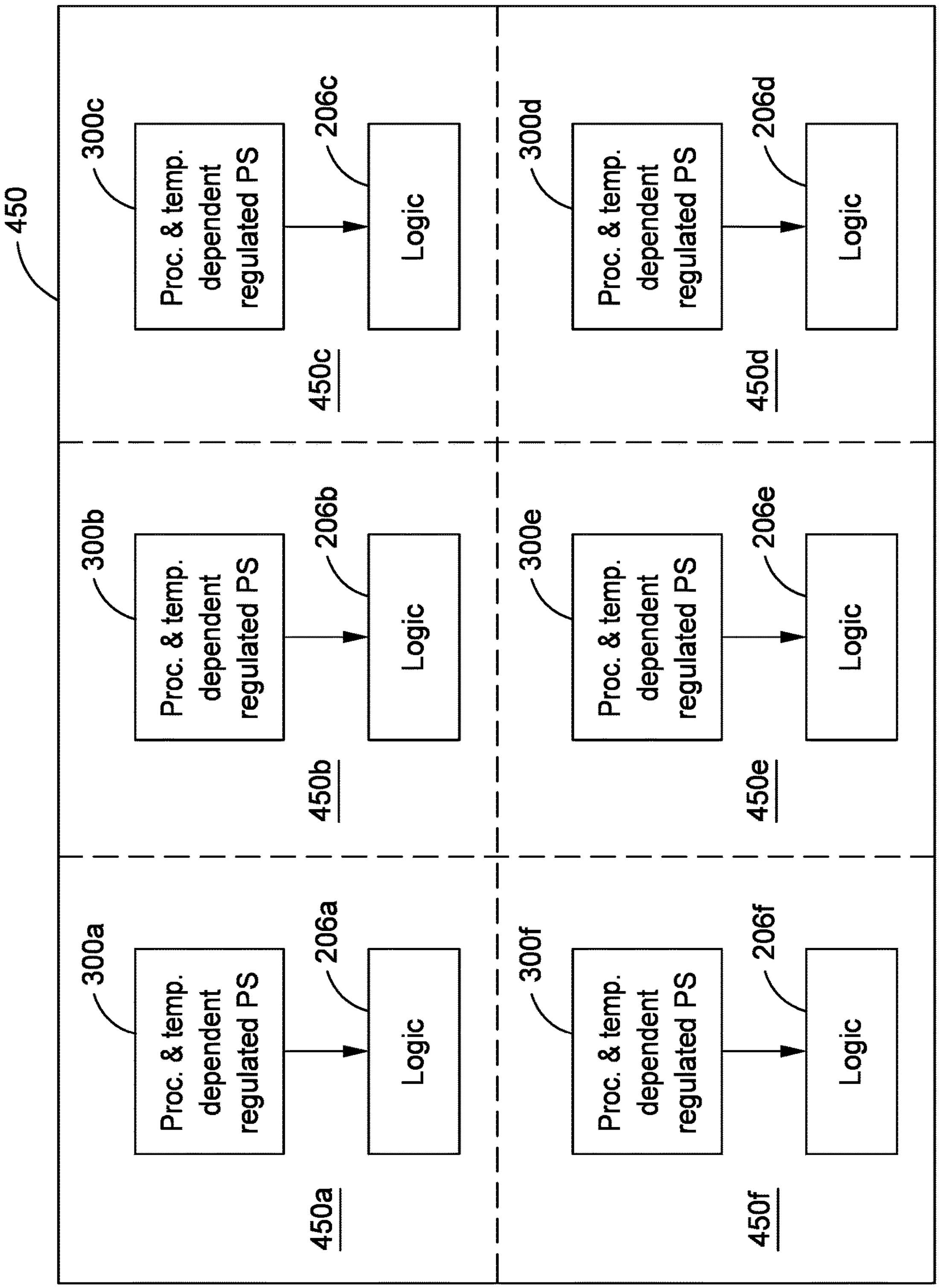
FIG. 4 illustrates a schematic diagram of a top view of a semiconductor integrated circuit having a plurality of process and temperature dependent reference voltage generators and regulators providing compensated voltage to an associated plurality of logic circuits, according to an example.

Referring to FIG. 4, depicted is a schematic diagram of a top view of a semiconductor integrated circuit having a plurality of process and temperature dependent reference voltage generators and regulators providing compensated voltage to an associated plurality of logic circuits, according to an example. A semiconductor integrated circuit die 450, for example a SoC, has a plurality of integrated circuit die areas 450*a*-450*f* having a plurality of digital logic circuit loads 206 thereon. A plurality of process and temperature dependent bias voltage generators 300 are provided to power associated ones of the plurality of digital logic circuit loads 206. Each process and temperature dependent bias voltage generator 300 will automatically provide an appropriate supply voltage (230) to a respective digital logic circuit load 206 located in the same area 450 thereof. Thus, a SoC integrated circuit having areas of different process conditions, e.g., SS, FF, TT, provide optimal operating voltages for the logic circuits 206 throughout the semiconductor integrated circuit die 450.

Figure 5:
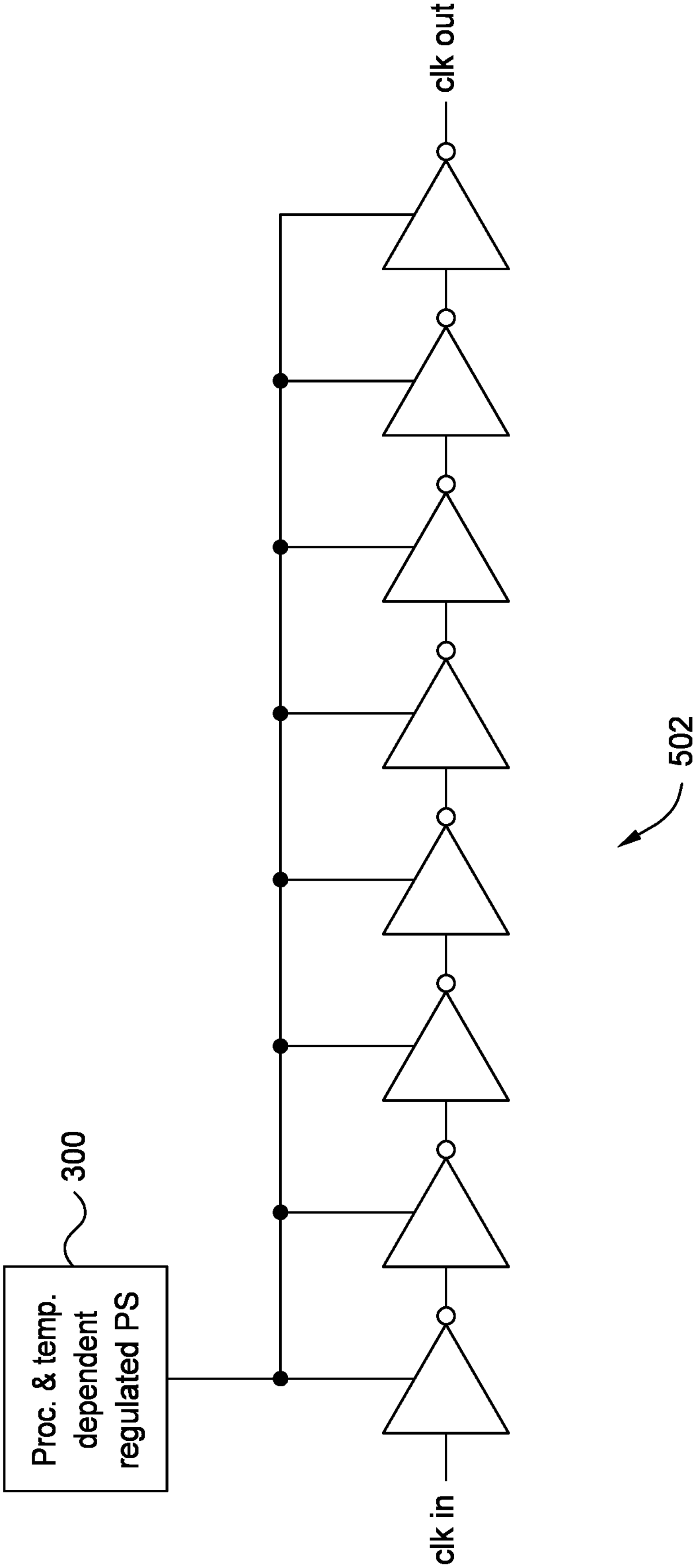
FIG. 5 illustrates a schematic diagram of a load network simulation circuit.

Referring to FIG. 5, depicted is a schematic diagram of a load network simulation circuit. A clock path network is shown comprising a cascaded 8-stage inverter chain 502. The inverter chain 502 is considered as the load to the process and temperature dependent reference voltage generator and regulator 300, as disclosed hereinabove. For this simulation R3=2 kilohms and R=4 kilohms of the process and temperature dependent bias voltage generator 304 (FIG. 3) were selected to generate the required reference voltage 214. 50 millivolt peak-to-peak noise at 40 MHz was coupled to the regulated supply voltage 230.

The input clock (Clk_in) frequency was one (1) GHz. The last stage of the (clock) inverter chain 502 drives (Clk_out) a wire load of 450 micrometers in length and 60 nanometers in width and spacing. Using SPICE simulations, different performance parameters were measured for the following two cases: Case 1—conventional LDO with a fixed input voltage reference, Case 2—the process and temperature dependent bias voltage generator 300 having temperature and process dependent variable voltage reference 214. Simulation corners: MOSFETs −5 (TT, SS3, FF3, SF3 and FS3), temperature low/high (−40° C. to 125° C.) resistors 2 (TT_RES, SS_RES and FF_RES). MOSFETS in 5 process conditions with 3-sigma variation: PMOS-Fast, NMOS-Fast; PMOS-Fast, NMOS-Slow; PMOS-Slow, NMOS-Slow; PMOS-Slow, NMOS-Fast; PMOS-Typical, NMOS-Typical. Resistor variation in 3—process conditions: Typical resistor, Fast resistor (30% less resistance than typical) and Slow resistor (30% more resistance than typical).

| Performance Comparison Table | Best | Nominal | Worst |
|---|---|---|---|
| Regulated Supply (mV) - Invention | 812 | 850 | 920 |
| Regulated Supply (mV) - Prior Art | 850 | 850 | 850 |
| Propagation Delay (ps) - Invention | 193.6 | 272.3 | 382.1 |
| Propagation Delay (ps) - Prior Art | 188.8 | 272.3 | 445.7 |
| Period Jitter (ps) - Invention | 3.95 | 6.75 | 11.9 |
| Period Jitter (ps) - Prior Art | 3.8 | 6.75 | 19.6 |
| Duty Cycle (%) - Invention | 50.22 | 50.74 | 51.3 |
| Duty Cycle (%) - Prior Art | 50.47 | 50.74 | 51.22 |
| Rise time (ps) - Invention | 35.4 | 53.55 | 77.9 |
| Rise time (ps) - Prior Art | 34.16 | 53.55 | 90.42 |

Observations

With the prior art configuration, propagation delay variation is about minus (−) 31 to 63 percent with reference to a nominal delay value. With the variable supply voltage examples disclosed herein, the propagation delay variation is about minus (−) 29 to 40 percent with reference to a nominal delay value. Control of the delay variation is improved by approximately 23 percent (63%-40%).

With the prior art configuration, the period jitter variation is minus (−) 44 to 190 percent with reference to a nominal period jitter value. With the variable supply voltage examples disclosed herein, the period jitter variation is about minus (−) 41 to 76 percent with reference to a nominal period jitter value. Jitter variation across process conditions is much improved with the variable supply voltage examples disclosed herein. There is a gain factor of about 114 percent (190%-76%).

With the prior art configuration, the rise time variation is about minus (−) 36 to 68 percent with reference to a nominal period jitter value. With the variable supply voltage examples disclosed herein, the period jitter variation is minus (−) 34 to 45 percent with reference to a nominal period jitter value. Rise time variation across process conditions is much improved with the variable supply voltage examples disclosed herein. There is a gain factor of about 23 percent (68%-45%). Critical parameters like jitter and delay are improved significantly with the variable supply voltage examples disclosed herein.

As will be appreciated by one skilled in the art and having the benefit of this disclosure, the embodiments disclosed herein may be embodied as a system, method, apparatus, or computer programmed product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

While the foregoing is directed to embodiments of the present invention, other and further embodiments of the invention may be devised without departing from the basic scope thereof, and the scope thereof is determined by the claims that follow.

What is claimed is:

1. An apparatus for on-chip integrated circuit voltage regulation, comprising:

a first voltage regulator having an input coupled to a reference voltage and an output providing a first regulated voltage;

a bias voltage generator having an input coupled to the first regulated voltage and an output providing a bias voltage; and a second voltage regulator having an input coupled to the bias voltage from the bias voltage generator and an output providing an adjusted regulated voltage that is varied in response to the bias voltage, wherein the bias voltage generator comprises a P-channel MOSFET and an N-channel MOSFET, and wherein a source of the P-channel MOSFET and a gate of the N-channel MOSFET are configured to receive an internal supply voltage such that the bias voltage automatically varies with local process and temperature conditions of a semiconductor region.

2. The apparatus according to claim 1, wherein the bias voltage generator and the second voltage regulator are disposed in a same semiconductor region as a logic circuit powered by the adjusted regulated voltage.

3. The apparatus according to claim 1, wherein the first voltage regulator is a first low drop out (LDO) voltage regulator.

4. The apparatus according to claim 1, wherein the second voltage regulator is a second low drop out (LDO) voltage regulator.

5. The apparatus according to claim 1, wherein the reference voltage is from a band gap voltage reference circuit.

6. The apparatus according to claim 5, wherein the reference voltage is about 0.6 volts DC from the band gap voltage reference circuit.

7. The apparatus according to claim 1, wherein process conditions of semiconductor devices of an integrated circuit are selected from a group consisting of slow-slow (SS), typical-typical (TT) and fast-fast (FF) process conditions.

8. The apparatus according to claim 7, wherein when the semiconductor devices of the integrated circuit are operating at the slow-slow (SS) process condition, a second regulated voltage is higher than when operating at the typical-typical (TT) process condition.

9. The apparatus according to claim 7, wherein when the semiconductor devices of the integrated circuit are operating at the fast-fast (FF) process condition, a second regulated voltage is lower than when operating at the typical-typical (TT) process condition.

10. The apparatus according to claim 7, wherein an increase in a temperature of the semiconductor devices increases the bias voltage from the bias voltage generator.

11. The apparatus according to claim 7, wherein the bias voltage generator comprises a series coupled N-channel metal oxide semiconductor field effect transistor (NMOS FET) and P-channel metal oxide semiconductor field effect transistor (PMOS FET) configured such that when the NMOS and PMOS FETs are in the slow-slow (SS) process condition, the bias voltage therefrom will be higher than when in the typical-typical (TT) process condition.

12. The apparatus according to claim 7, wherein a second regulated voltage is about 50 to 100 millivolts higher than a nominal second regulated voltage when the semiconductor devices of the integrated circuit are operating in the slow-slow (SS) process condition.

13. The apparatus according to claim 7, wherein a second regulated voltage is about 50 to 100 millivolts lower than a nominal second regulated voltage when the semiconductor devices of the integrated circuit are operating in the fast-fast (FF) process condition.

14. An integrated circuit (IC), comprising:

a plurality of on-chip integrated circuit voltage regulators adapted for providing optimal operating voltages to a plurality of digital logic circuits associated with the plurality of on-chip integrated circuit voltage regulators, wherein each of the plurality of on-chip integrated circuit voltage regulators comprises, a first voltage regulator having an input coupled to a reference voltage and an output providing a first regulated voltage, a bias voltage generator having an input coupled to the first regulated voltage and an output providing a bias voltage, wherein the bias voltage generator comprises a P-channel MOSFET and an N-channel MOSFET, and wherein a source of the P-channel MOSFET and a gate of the N-channel MOSFET are configured to receive an internal supply voltage such that the bias voltage automatically varies with local process and temperature conditions of a semiconductor region, and a second voltage regulator having an input coupled to the bias voltage from the bias voltage generator and an output providing an adjusted regulated voltage that is varied in response to the automatically varying bias voltage, wherein each pair of the on-chip integrated circuit voltage regulators and digital logic circuits are located in different portions of the integrated circuit.

15. The IC according to claim 14, wherein process conditions of semiconductor devices of the integrated circuit are selected from a group consisting of slow-slow (SS), typical-typical (TT) and fast-fast (FF) process conditions.

16. The IC according to claim 15, wherein when the semiconductor devices of the integrated circuit are operating at the slow-slow (SS) process condition at certain portions of the integrated circuit, a second regulated voltage is higher than when operating at the typical-typical (TT) process condition, and when other ones of the semiconductor devices of the integrated circuit are operating at the fast-fast (FF) process condition at certain other portions of the integrated circuit, the second regulated voltage is lower than when operating at the typical-typical (TT) process condition.

17. The IC according to claim 16, wherein the second regulated voltage is about 50 to 100 millivolts higher than a nominal second regulated voltage when the semiconductor devices of the integrated circuit are operating in the slow-slow (SS) process condition, and the second regulated voltage is about 50 to 100 millivolts lower than the nominal second regulated voltage when the semiconductor devices of the integrated circuit are operating in the fast-fast (FF) process condition.

18. A method, comprising:

generating, from a reference voltage, a first regulated voltage;

generating, from the first regulated voltage, a bias voltage, wherein a source of a P-channel MOSFET and a gate of an N-channel MOSFET of a bias voltage generator are configured to receive an internal supply voltage such that the bias voltage automatically varies with local process and temperature conditions of a semiconductor region; and adjusting an output voltage of an on-chip integrated circuit voltage regulator in response to the automatically varying bias voltage, wherein the output voltage is adapted for coupling to and powering semiconductor devices of an integrated circuit.

19. The method according to claim 18, wherein the output voltage is about 50 to 100 millivolts higher than a nominal output voltage when the semiconductor devices of the integrated circuit are operating in the slow-slow (SS) process condition; and the output voltage is about 50 to 100 millivolts lower than the nominal output voltage when the semiconductor devices of the integrated circuit are operating in the fast-fast (FF) process condition.

* * * * *